United States Patent [19]
Ferencz

[11] 3,986,785
[45] Oct. 19, 1976

[54] VERTICAL AXIS WIND MOTOR

[76] Inventor: David Ferencz, 8 Simtat Matzada, Bat Yam, Israel

[22] Filed: Feb. 4, 1975

[21] Appl. No.: 546,914

[52] U.S. Cl. .................................. 415/2; 415/187; 415/208
[51] Int. Cl.² ......................................... F03D 3/04
[58] Field of Search ................................ 415/2–4, 415/208, 187; 417/334–336

[56] References Cited
UNITED STATES PATENTS

| | | | |
|---|---|---|---|
| 63,498 | 4/1867 | Gallup | 415/2 |
| 181,293 | 8/1876 | Wallace | 415/4 |
| 772,786 | 10/1904 | Clifford | 415/2 |
| 964,374 | 7/1910 | Bey | 415/3 |
| 1,595,578 | 8/1926 | Sovereign | 415/2 |
| 1,764,052 | 6/1930 | Peifer | 415/2 |

FOREIGN PATENTS OR APPLICATIONS

| | | | |
|---|---|---|---|
| 545,003 | 10/1922 | France | 415/2 |
| 188,653 | 3/1923 | United Kingdom | 415/2 |

*Primary Examiner*—C. J. Husar
*Attorney, Agent, or Firm*—Benjamin J. Barish

[57] ABSTRACT

A vertical-axis wind motor comprises an annular wind deflector assembly surrounding the rotor assembly and including a plurality of deflectors oriented to deflect the wind so that, from all wind directions, a greater wind force is applied to the rotor vanes on one side of the vertical axis than on the other side. Such a wind motor may be constructed of very large dimensions both in height and diameter so as to more efficiently exploit the wind energy.

3 Claims, 2 Drawing Figures

VERTICAL AXIS WIND MOTOR

BACKGROUND OF THE INVENTION

The present invention relates to wind motors, and particularly to wind motors capable of converting wind energy to mechanical or electrical energy.

The conventional form of wind motor includes a rotor rotatably mounted about a horizontal axis. Such wind motors, on the one hand, must be constructed of substantial size in order to produce a significant power output, but on the other hand, they have practical structural limitations on size. For these reasons, wind motors are rarely used in urban areas.

SUMMARY OF THE INVENTION

An object of the present invention is to provide a wind motor of novel construction which is better able to exploit the wind energy, and which is particularly capable of producing large mechanical and/or electrical outputs.

According to a broad aspect of the present invention there is provided a wind motor comprising: a rotor assembly including a plurality of wind-drivable vanes rotatable on a vertical axis rather than a horizontal axis, and an annular wind deflector or assembly surrounding the rotor and including a plurality of deflectors oriented to deflect the wind so that for all wind directions a greater wind force is applied to the rotor vanes on one side of its vertical axis than on the other side, thereby causing the wind from all directions to rotate the rotor assembly.

The rotor vanes are planar and are oriented in the rotor assembly so that their outer ends form equal acute angles to the radial lines passing through the vertical axis of the rotor assembly. The deflectors are also planar and are fixed in the deflector assembly so that their outer ends also form equal acute angles, but larger than those of the rotor vanes, to the radial lines passing through the vertical axis of the rotor assembly.

According to further features, the rotor assembly includes an upper circular plate and a lower circular plate, with the rotor vanes being fixed between the two plates. In addition, the deflector assembly includes an upper annular rings and a lower annular ring, with the deflectors being fixed between the two rings. The upper and lower annular rings of the deflector assembly are fixed to a central stationary shaft, and the upper and lower circular plates of the rotor assembly are fixed to a hollow rotor shaft coaxial with the rotor vertical axis, the stationary shaft of the deflector assembly passing through the hollow rotor shaft of the rotor.

Wind motors constructed in accordance with the foregoing features may be efficiently built of very substantial size, both in vertical height and in horizontal diameter, so as to intercept a very large cross-section of the wind and to convert its energy into a mechanical or electrical output.

Further features and advantages of the invention will be apparent from the description below.

BRIEF DESCRIPTION OF THE DRAWINGS

The invention is herein described, somewhat diagrammatically and by way of example only, with reference to a preferred embodiment illustrated in the accompanying drawings, wherein.

DESCRIPTION OF THE PREFERRED EMBODIMENT

Figures 1, 2:
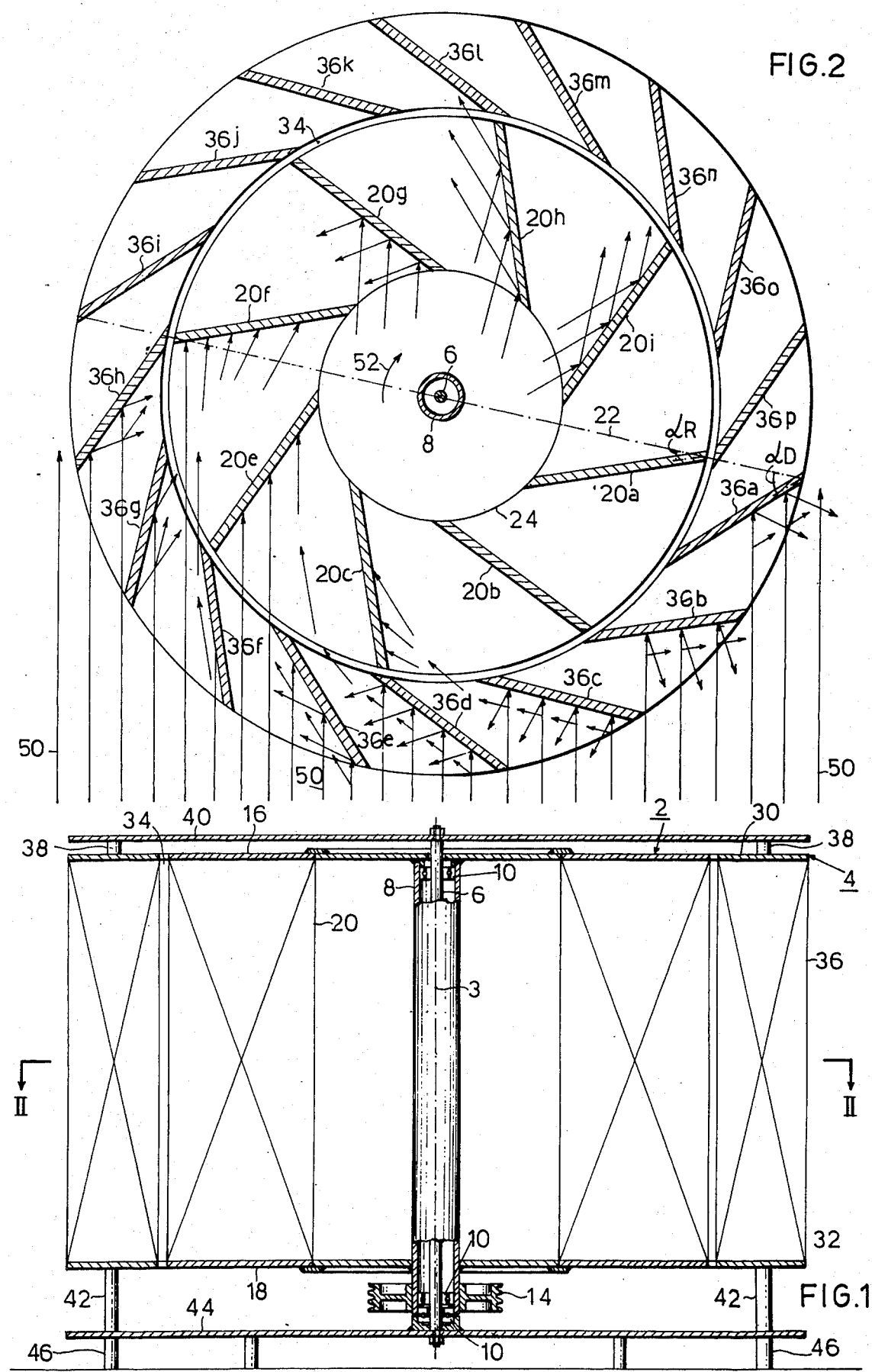
FIG. 1 diagrammatically illustrates in a wind motor constructed in accordance with the invention.
FIG. 2 diagrammatically illustrates in the arrangement of the rotor vanes and the deflectors in the wind motor of FIG. 1.

The wind motor illustrated in the drawings comprises two main assemblies, namely an inner rotor assembly generally designated 2, rotatable on a vertical axis 3, and an outer deflector assembly generally designated 4. The outer deflector assembly is fixed to a central stationary shaft 6, and the inner rotor assembly is fixed to a hollow rotor shaft 8 through which the stationary deflector assembly shaft 6 passes, both shafts being coaxial with the vertical axis 3 of rotation. A pair of bearings 10 are interposed between the two shafts. The power produced by the rotation of the rotor assembly 2 is outputted via a gear 14 fixed to the hollow rotor shaft 8.

The rotor assembly 2 includes a pair of circular plates fixed to rotor shaft 8, namely an upper plate 16 and a lower plate 18. A plurality of planar vanes 20 are fixed between the two plates 16, 18, to form a circular array of vanes completely around the circumference of the plates. As shown in FIG. 2, the described example illustrates eight rotor vanes 20, labelled 20a–20i. The vanes are all symmetrically disposed about the centre axis 3 of the rotor shaft 8 and are oriented to form the same angle with respect to the radial lines 22 passing through the rotor axis. In FIG. 2, the outer ends of each vane 20 are shown as forming an acute angle $\alpha_R$ with respect to the radial lines 22.

The inner ends of vanes 20 lie on a circle 24 (FIG. 2) which extends between the centre axis of rotation 3 and the outer circumference of the circular plates 16, 18 to which the vanes are fixed. The outer ends of the rotor vanes 20 extend to the outer circumference of circular plates 16, 18.

The deflector assembly 4 includes a pair of annular rings, namely an upper ring 30 and a lower ring 32, having an inner diameter slightly larger than the outer diameter of the circular plates 16, 18 to provide a small gap 34 between them. A plurality of planar deflectors 36 are fixed between the two annular rings 30, 32, and extend completely across the annular rings from their inner ends to their outer ends. In the example illustrated in FIG. 2, there are sixteen deflectors 36, labelled 36a–36p. Deflectors 36 are all oriented at the same angle with respect to the radial lines 22 passing from the vertical axis 3 of rotation of the rotor, but in this case the angle $\alpha_D$ formed by the outer ends of each deflector is larger than the angle $\alpha_R$ formed by the outer ends of the rotor vanes 20.

The deflector assembly 4 is secured to its stationary shaft 6 by suitable structural members, such as by a plurality of upper vertical rods 38 fixed to an upper horizontal plate 40 disposed above the rotor assembly 4, and by a plurality of lower vertical rods 42 fixed to a lower horizontal plate 44 disposed below the rotor assembly.

The wind motor may be supported in the illustrated vertical position by means of a plurality of vertical supports or pillars 46 depending from the lower horizontal plate 44.

As will be seen in FIG. 2, the orientation of the deflectors 36 with respect to the rotor vanes 20 is such that, from all wind directions, the deflectors cause a greater wind force to be applied to the rotor vanes on one side of the rotor vertical axis 3 than on the other side, so that a resultant force will be produced by the wind on the rotor vanes causing the rotor to rotate. Thus, assuming the wind comes from the direction shown by arrows 50 in FIG. 2, it will be seen that the wind impinging the deflectors 36a and 36b will be deflected away from the rotor vanes, while the wind impinging deflector 36c–36h will be deflected towards the rotor vanes. The latter deflected wind will impinge mostly the rotor vanes to the left of the vertical axis 3 causing the rotor assembly to rotate in the clockwise direction as shown by arrows 52. The same will be true from any other wind direction, rotor assembly 2 always rotating in the clockwise direction in the arrangement illustrated. In addition, and as shown by the arrows in FIG. 2, by making both the rotor vanes and the deflectors planar, and orienting the rotor vanes so that the rotor angle $\alpha_R$ is smaller than the deflector angle $\alpha_D$, a substantial quantity of wind is deflected from a front face of the rotor vanes (e.g., 20e, 20f) across the vertical axis of the rotor to impinge the rear face (e.g. 20h, 20i) of other rotor vanes in the direction aiding in the rotation of the rotor assembly.

It will be appreciated that the deflectors 36, instead of being fixed to their respective annular ring 30, 32, could be adjustably mounted to their rings so as to enable a variation to be made in their angle D with respect to the radial lines 22. The vanes 20 could also be made adjustable in a similar manner with respect to their mounting plates 16, 18. Making the deflectors and/or vanes adjustable in the foregoing manner will enable the wind motor output to be varied, for example to increase the speed of rotation of the rotor assembly under low-velocity wind conditions and to decrease its speed under high-velocity wind conditions.

Many other variations, modifications and applications of the illustrated embodiment will be apparent.

What is claimed is:

1. A wind motor comprising a rotor assembly including a plurality of wind-drivable vanes rotatable on a vertical axis, and an annular wind deflector assembly surrounding the rotor assembly and including a plurality of deflectors oriented to deflect the wind so that for all wind directions a greater wind force is applied to the rotor vanes on one side of its vertical axis than on the other side thereby causing the wind to rotate the rotor assembly about its vertical axis, said rotor assembly including an upper circular plate, a lower circular plate, and a central rotary shaft fixed to said circular plates, said rotor vanes being fixed between said two circular plates, said deflector assembly including an upper annular ring, a lower annular ring, an upper horizontal plate fixed to said upper annular ring, a lower horizontal plate fixed to said lower annular ring, supports carried by said lower annular ring, and a central stationary shaft fixed to said upper and lower horizontal plates and coaxial with said central rotary shaft, said deflectors being fixed between said two rings, the rotor vanes being planar and oriented in the rotor assembly so that their outer ends form equal acute angles to the radial lines passing through the vertical axis of the rotor assembly, the deflectors also being planar and being fixed in the deflector assembly so that their outer ends form equal acute angles, larger than the acute angles of the rotor vanes, to the radial lines passing through the vertical axis of the rotor assembly.

2. A wind motor as defined in claim 1, wherein the deflectors extend substantially from the inner ends to the outer ends of their respective annular rings.

3. A wind motor as defined in claim 1, wherein the rotor vanes extend from a circle formed at an intermediate portion on their respective circular plates to substantially the outer ends thereof.

* * * * *